United States Patent [19]

Ohnishi

[11] Patent Number: 4,574,268
[45] Date of Patent: Mar. 4, 1986

[54] THEFT WARNING SYSTEM

[75] Inventor: Kenichi Ohnishi, Toyota, Japan

[73] Assignee: Toyota Jidosha Kabushiki Kaisha, Aichi, Japan

[21] Appl. No.: 704,279

[22] Filed: Feb. 22, 1985

[30] Foreign Application Priority Data

May 22, 1984 [JP] Japan ................................ 59-102839

[51] Int. Cl.$^4$ ........................ B60R 25/04; E05B 45/06
[52] U.S. Cl. ........................................ 340/64; 340/63;
340/523; 340/528; 340/542; 340/52 R; 307/10
AT; 180/173
[58] Field of Search ............... 340/64, 63, 52 F, 52 R,
340/54, 56, 541, 542, 506, 543, 516, 521–523,
545, 528; 307/10 AT, 10 R; 180/173, 287;
70/237–239, 262, 263, 416

[56] References Cited

U.S. PATENT DOCUMENTS

| 3,858,175 | 12/1974 | Kopera, Jr. | 340/523 |
| 4,035,791 | 7/1977 | Katayama | 340/542 |
| 4,479,110 | 10/1984 | Cipri | 340/64 |

Primary Examiner—Donnie L. Crosland
Attorney, Agent, or Firm—Parkhurst & Oliff

[57] ABSTRACT

A theft warning system for use in a vehicle, which issues a warning to protect vehicle contents when a vehicle door is opened without use of a door key. The theft warning condition is set only when all doors are closed while all the door lock devices are locked. The theft warning system generates a theft warning signal when the final open door is closed and locked without use of a door key and one of the door lock devices subsequently is unlocked without a door key.

11 Claims, 5 Drawing Figures

THEFT WARNING SYSTEM

BACKGROUND OF THE INVENTION

The present invention relates to a theft warning system, and more particularly to a theft warning system which issues a warning to protect vehicle contents when a vehicle door is opened without actuation of a door key.

Known theft warning devices will detect opening of one of the vehicle doors without actuation of a door key and issue a warning. Such a theft warning device is set to a warning condition when the door lock devices are in a locked state, or when all of the vehicle doors and the trunk are closed. If the device is in this set condition and one of the vehicle doors or the trunk lid is opened without a door key, the theft warning device determines that the vehicle is being broken into. Subsequently, based on this determination, the theft warning device will issue a warning signal to pulsate the vehicle horn, or repeatedly flash the vehicle headlights and taillights. Such a theft warning device is set to the warning condition even if a vehicle door is closed by a seated passenger. Hence, when the passenger opens a door to bet out, the theft warning device will activate, thereby generating alarm signals.

SUMMARY OF THE INVENTION

The present invention was made in view of the foregoing background and to overcome the foregoing drawbacks. It is accordingly an object of this invention to provide a theft warning system which is set to a warning condition only when a door lock device is locked by an operator outside of the vehicle.

To attain the above objects, a theft warning system according to the present invention is installed in a vehicle to issue a warning to protect the vehicle contents when a door is opened without actuation of a door key. The theft warning system comprises an engine ignition switch, a door switch, a door lock switch, a door unlock device which detects whether a door lock device is unlocked by actuation of a door key, and a controller which sets a theft detecting condition when all the doors are closed and locked, and the engine ignition switch is open, i.e., in the "off" position. The controller determines that the vehicle is being broken into when one of the doors is opened without actuation of a door key, and subsequently generates an alarm signal. The alarm signal is sent to an alarm to generate a sound alarm and/or flash a light.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
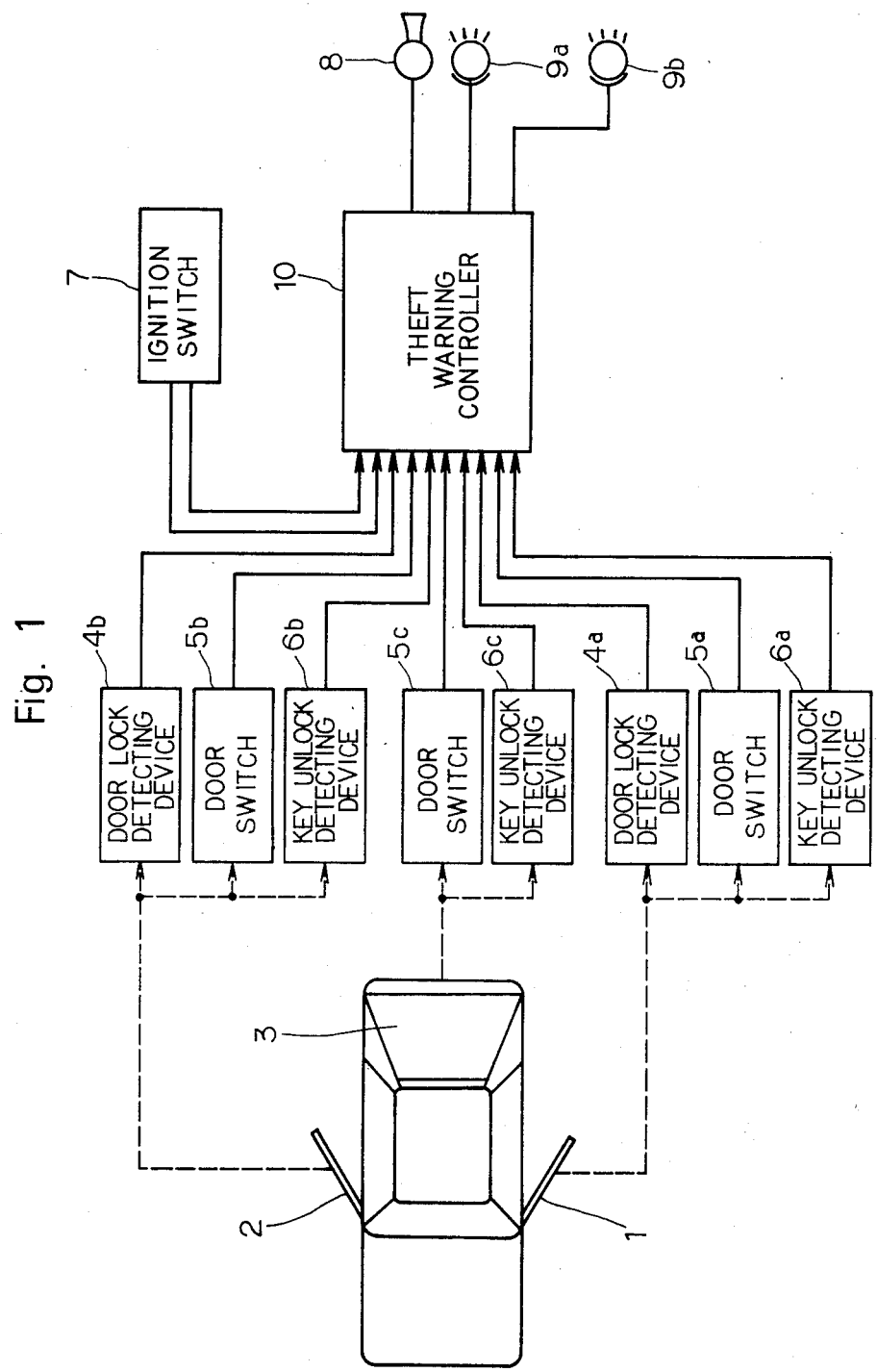
FIG. 1 is a general view of a theft warning system according to the present invention, which is installed in a vehicle.
Figure 2:
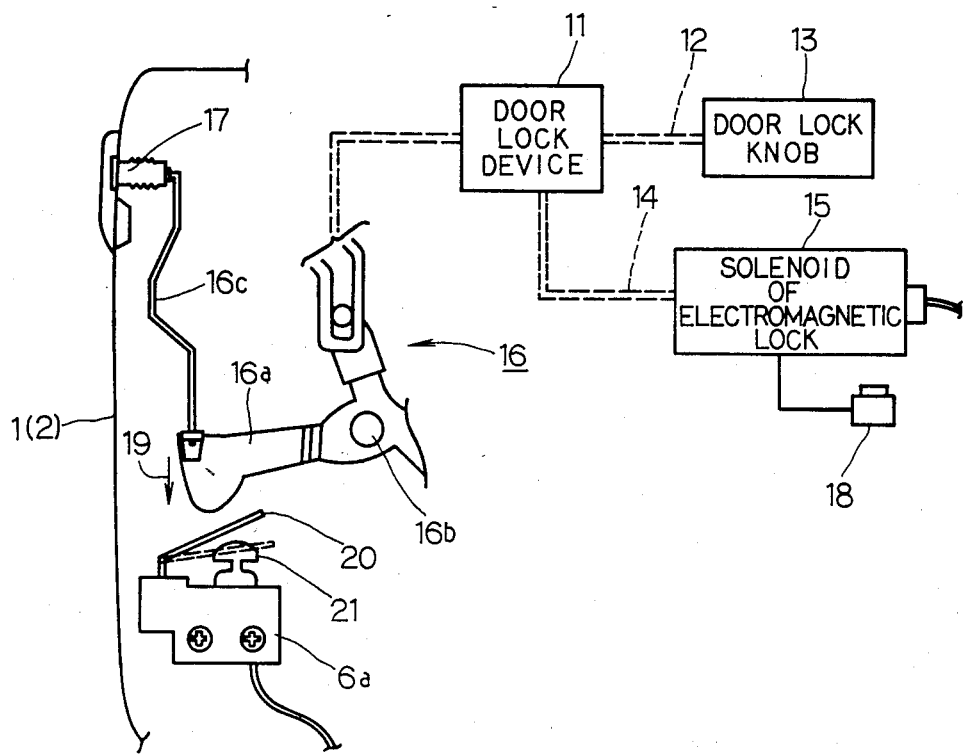
FIG. 2 is a detailed partial view of a door lock device which is employed in the vehicle shown in FIG. 1.

FIG. 1 shows a general view of a theft warning system according to the present invention, which is installed in a vehicle. In this embodiment, the theft warning device is installed in a three door type vehicle. Each of doors 1 and 2 is equipped with a door lock device 11, as shown in FIG. 2. A back door 3 is equipped with a similar door lock device. The door lock devices 11, which are shown in FIG. 2, are designed to be locked or unlocked by the actuation of a door lock knob 13, an electromagnetic lock switch or a door key (not shown). Further, if, after a door lock device 11 has been actuated into the locked state, the corresponding door is closed while its outside door handle (not shown) is maintained in its opening position, the doors 1 and 2 are designed to close and lock without actuation of a door key. On the other hand, if one of the doors 1 and 2 is closed without the door outside handle maintained in its opening position, the corresponding door lock is automatically released and unlocked. In contrast, the back door 3 is designed to be automatically locked simply by closing it.

As shown schematically in FIG. 1, the door 1 is equipped with a door lock detecting device 4a which detects whether the door 1 is locked or unlocked and generates a corresponding door locked signal or door unlocked signal. The door 1 is also equipped with a conventional door switch 5a which detects whether the door 1 is open or closed and generates a corresponding door open signal or door closed signal, and is equipped with a key unlock detecting device 6a which detects whether or not the door lock device 11 in the door 1 is unlocked with a door key and generates a key unlock signal when the door lock device 11 is so unlocked.

Similarly, another door 2 has another door lock detecting device 4b which detects whether the door 2 is locked or unlocked and generates a corresponding door locked signal or door unlocked signal. As with the door 1, the door 2 is equipped with a conventional door switch 5b which detects whether the door 2 is open or closed and generates a corresponding door open signal or door closed signal, and is equipped with a key unlock detecting device 6b which detects whether or not the door lock device 11 in the door 2 is unlocked with a door key and generates a key unlock signal when the door lock device 11 is so unlocked.

The back door 3, which is disposed above a trunk area, is equipped with a conventional door switch 5c which detects whether the back door 3 is open or closed and generates a corresponding back door open signal or back door closed signal according to the result of the detection, and further is equipped with a key unlock detecting device 6c which detects whether or not the back door lock device is unlocked with a back door key and generates a corresponding key unlock signal when the back door lock device 23 is so unlocked.

FIG. 2 shows a detailed partial view of the door lock device 11 which is employed in the vehicle shown in FIG. 1. As shown in FIG. 1, the door lock device 11 is provided in each of the doors 1 and 2. The door lock device 11 shown in FIG. 2 is connected to a manual door lock knob 13, a solenoid 15 of an electromagetic lock, a door key cylinder 17 by link structures 12, 14 and 16, respectively. The door lock device 11 will activate the solenoid 15 to lock or unlock the door 1, 2 upon receiving an appropriate signal from the manual door lock knob 13, or the door key cylinder 17. Alternative door lock devices, for example, non-electric ones, are well known to one of ordinary skill in the art.

Figure 3A:
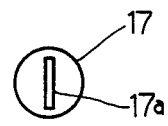
FIGS. 3 (A and B) are views illustrating the conditions of a door key cylinder.
Figure 3B:
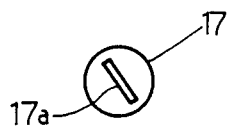

As shown in the present embodiment, the door key cylinder 17 is connected with the door lock device 11 as follows: An arm 16a of the link structure 16 is mounted to be rotatable about an axis 16b. A tip end of the arm 16a is connected with the door key cylinder 17 by an arm 16c. The key unlock detecting device 6a, which comprises a limit switch, is located under the arm 16a. In FIG. 2, the arm 16a is positioned at its neutral point. In this condition, a door key slot 17a of the door key cylinder 17 is positioned as shown in FIG. 3(A). To unlock the door lock device 11 with a door key, an operation inserts a door key into the key slot 17a and rotates the door key in the counterclockwise direction as shown in FIG. 3(B). This rotation of the door key swings the arm 16a downwardly by operation of the arm 16c, in the direction indicated by the arrow 19 in FIG. 2. This swing movement of the arm 16a displaces a movable contact 20 toward the downward direction, thereby pressing a detector 21 of the limit switch 22 to generate the key unlock signal.

The door lock detecting device 4a, 4b as shown comprises a switch 18 actuated by the solenoid 15, such that the switch 18 turns on when the solenoid 15 unlocks the door 1, 2 and turns off when the solenoid 15 locks the door 1, 2. Alternative detectors, whether electrical, optical, mechanical or otherwise, are well known to one of ordinary skill in the art.

The relation between the devices and the mode of the signals, is described in the following Table:

TABLE I

| DETECTOR | KIND OF SWITCH | MODE OF SIGNAL |
| --- | --- | --- |
| DOOR LOCK DETECTING DEVICE 4a, 4b | SWITCH 18 IS ACTUATED BY SOLENOID 15 OF ELECTROMAGNETIC LOCK | UNLOCKED SIGNAL: ON LOCKED SIGNAL: OFF |
| DOOR OPENING DETECTOR | DOOR SWITCH 5a, 5b, 5c | OPEN: ON CLOSED: OFF |
| KEY UNLOCK DETECTING DEVICE 6a, 6b, 6c | LIMIT SWITCH 22 | KEY UNLOCK SIGNAL: ON |

The output signals of the devices 4(a,b), 6(a, b, c) and switches 5(a, b, c) are inputted into an electronic theft warning controller 10 which comprises a microcomputer. An OFF signal and an ACCESSORY signal of an ignition switch 7 are also inputted into the controller 10. Based on these signals, the controller 10 determines whether the vehicle is being broken into. When it is determined that a vehicle door has been unlocked without a door key, the controller 10 outputs a theft warning signal to pulsate a horn 8 or repeatedly flash a headlight 9a and taillight 9b for predetermined time.

The theft warning controller 10 comprises a first part which sets the controller 10 into an operational state, and a second part which determines whether a break-in is occurring.

Figure 4:
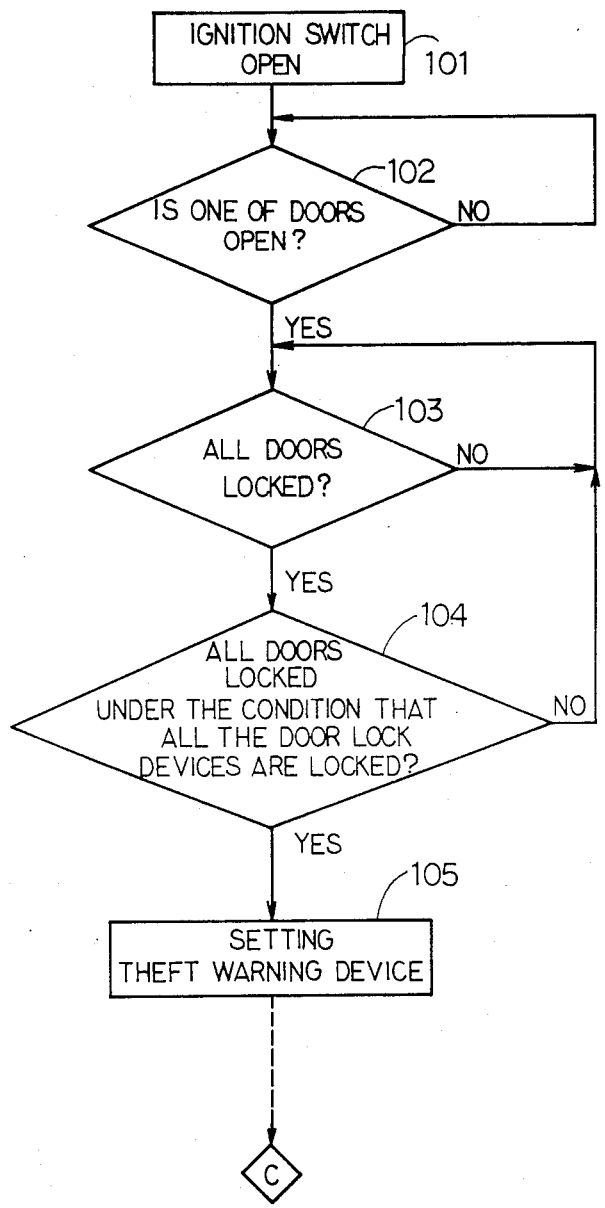
FIG. 4 is a flow chart for setting a theft warning condition of the system according to the present invention.

The program of the first part of the theft warning controller 10 is carried out by a flow chart as shown in FIG. 4. The program of the first part is designed such that the theft warning controller 10 cannot be set to an operational condition by a passenger located within the passenger compartment of the vehicle.

In step 101, an OFF signal of an ignition switch 7 is inputted to the controller 10. The program proceeds to step 102, wherein it is determined according to the signal of the door switches 5a, 5b whether one of the doors 1 and 2 is open. This step is repeated until it is determined that a door is open. When a door open signal is inputted from one of the door switches 5a and 5b, the program proceeds to step 103. In the step 103, it is determined according to the output signals of the door lock detecting devices 4a and 4b whether all the doors 1, 2 and 3 are locked (the door 3 is assumed to be locked if it is closed). This step is repeated until it is determined in the step 103 that all the doors are locked, at which point the program proceeds to step 104. In the step 104, it is determined whether all the doors 1, 2 and 3 have been closed while all the door lock devices 11 were maintained in the locked state, i.e., if the door 3 has been closed and the last of the doors 1 and 2 to be closed was closed while its outside handle was held in the open position. If the doors 1, 2 and 3 have not been closed in this fashion, the program returns to step 103. If it is determined according to the output signals of the door lock detecting devices 4a and 4b, the door switches 5a, 5b and 5c that the result of the step 104 is YES, the program proceeds to step 105. In the step 105, the theft warning device is set to the standby condition after a predetermined time (for example, 2 seconds) elapses.

As described above, the condition of the step 104 is that all the doors 1, 2 and 3 are locked while all the door lock devices 11 are maintained in the locked state. This condition of the step 104 is satisfied only when the doors 1 and 2 are locked from the outside without actuation of a door key. Hence, the theft warning device cannot be set to the standby state by a passenger located within the passenger compartment. Thus, the erroneous setting of the theft warning device can be obviated.

For example, assuming the back door 3 is already closed, the theft warning device is set to the standby state after one of the doors 1 and 2 is locked and closed by any technique, i.e., using a key, the door lock knob 13 or a switch and subsequently the remaining open door is locked and, while locked, is closed without actuation of a door key, i.e., from the outside while holding the door handle in the open position. If the back door 3 is open, and the doors 1 and 2 are locked in the above order, the theft warning device will be set to the standby state after the back door 3 is closed. If the second of doors 1 and 2 is locked with a door key, the condition set in the step 104 is not met. Hence, the theft warning device will not be set to the standby state.

Figure 5:
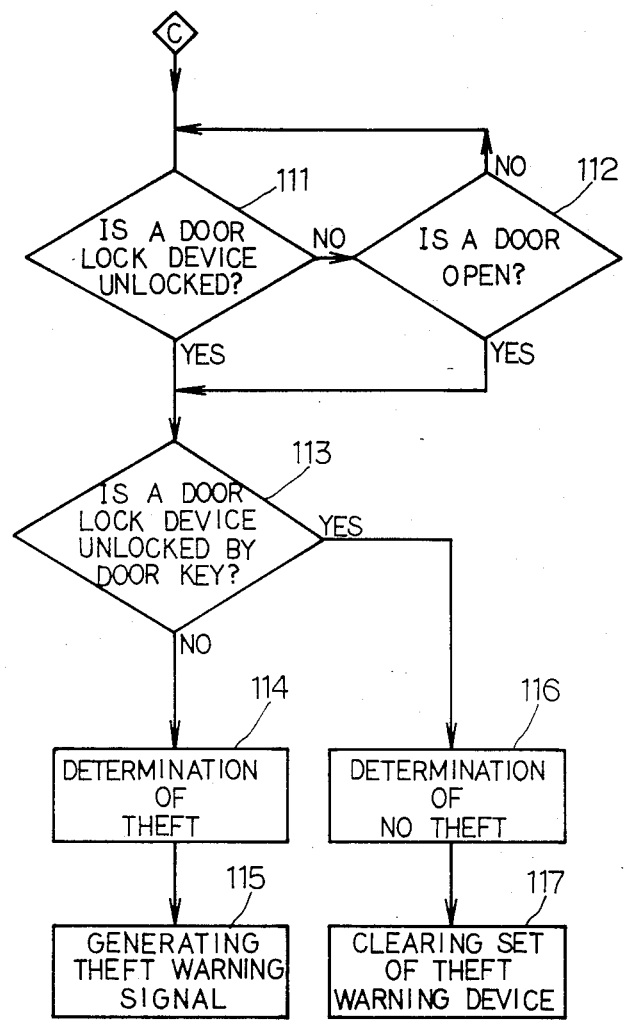
FIG. 5 is a flow chart for detecting whether a vehicle is being broken into.

The theft warning device, once set by the flow chart shown in FIG. 4, is operated by the flow chart as shown in FIG. 5.

In step 111, it is determined according to the output signals of the door lock detecting devices 4a and 4b whether the door lock device 11 is unlocked. It is determined in step 111 that the door lock devices 11 are locked, the program proceeds to step 112, wherein it is determined by the output signals of the door switches 5a, 5b and 5c whether one of the doors 1, 2, and 3 is open. If it is determined in step 111 that at least one of doors 1 and 2 is unlocked, or if it is determined in step 112 that at least one of doors 1, 2 and 3 is open, the program proceeds to step 113. In step 113, it is determined according to the output signals of the key unlock detecting devices 6a, 6b and 6c whether one of the door lock devices 11 was unlocked with a door key. If it is determined in step 113 that a door lock device 11, 23 was unlocked without the operation of a door key, the program proceeds to step 114, wherein it is determined that the car is being broken into. Next, the program proceeds to step 115, wherein the theft warning controller 10 generates a theft warning signal.

If it is determined in step 113 that a door lock device 11, 23 was unlocked with a door key, it is determined in step 116 that the car is not being broken into, but, rather, that the owner has unlocked the door lock device 11, 23. The program proceeds from step 116 to step 117, wherein the theft warning device is released from the standby state. Alternatively, when it is determined in step 113 that a door lock device 11, 23 was unlocked with a door key, the theft detecting system may be released from the standby condition to the cleared condition when it receives an ACCESSORY signal from the ignition switch 7.

If the theft warning signal is outputted at step 115, the horn 8 is pulsated intermittently, for example, in a 0.2 seconds cycle, and the headlight 9a and taillight 9b are repeatedly flashed. The horn 8, the headlight 9a and the taillight 9b automatically stop sounding and flashing after a predetermined time, for example, 5 minutes, elapses. The theft warning device is reset to the standby condition by this automatic stopping of the horn and lights. In order to stop actuation of the horn 8 and the lamps 9, the same operation as that for clearing the set of the theft warning device, such as that in step 117, may be done, followed by a resetting as in step 105.

As described above, according to the present embodiment, the theft warning device cannot be set by the operation of a passenger who is located within the passenger compartment. Hence, the erroneous setting of the theft warning device can be avoided.

The embodiment of the theft warning device presently described is in a three door type vehicle. As is readily apparent, the device also may be used in a four door type vehicle, with or without a rear door.

While the present invention has been described in its preferred embodiments, it is to be understood that the invention is not limited thereto, and may be otherwise embodied within the scope of the following claims.

What is claimed is:

1. A theft warning system for use in a vehicle having a plurality of doors with door lock devices, comprising:
   first means for detecting whether an ignition switch of the vehicle is open or closed and generating a signal according to the condition of the ignition switch;
   second means for detecting whether each of said vehicle doors is open or closed and generating a signal according to the condition of each said door;
   third means for detecting whether said door lock device of at least one of said doors is locked or unlocked, and generating a signal according to the condition of said door lock device;
   fourth means for detecting whenever one of said door lock device is unlocked by actuation of a door key, and generating a signal indicating that one of said door lock devices has been so unlocked;
   control means for receiving the signals generated by the first, second, third and fourth means, said control means setting a theft detecting condition when a last of said doors is closed by an operator outside of the vehicle while the ignition switch is open and all of said door lock devices are locked, and for generating a theft warning signal when, after setting of said theft detecting condition, one of said vehicle doors is opened or unlocked without use of a door key; and
   alarm means responsive to said theft warning signal for generating an alarm signal.

2. The theft warning system of claim 1, wherein said control means sets said theft detecting condition when it:
   detects that said ignition switch is open;
   detects that one of said doors is open;
   detects that all said door lock devices are in a locked condition; and
   subsequently detects the closing of said open door while all of said door lock devices are maintained in a locked position.

3. The theft warning system of claim 1, wherein said control means clears the set of said theft detecting condition when a door is opened with the use of a door key.

4. The theft warning system of claim 1, wherein at least one of said doors can be closed while the door lock device of said door is maintained in a locked condition only while a handle of said door is held in an open condition.

5. The theft warning system of claim 1, wherein each said door lock device comprises a movable member responsive to actuation of a door key, and said fourth means comprises a limit switch disposed adjacent said movable member such that when said movable member moves in response to actuation of a door key, said limit switch is moved by said movable member to generate said signal indicating unlocking of said door lock device by use of a door key.

6. The theft warning system of claim 1, wherein said third means comprises a switch responsive to a solenoid of an electromagnetic lock of each said door lock device.

7. The theft warning system of claim 1, wherein said third means comprises a detector for determining by electrical means when a bolt of said door lock device is in a locked position.

8. The theft warning system of claim 1, wherein said vehicle is equipped with a back door which locks automatically when the back door is closed.

9. The theft warning system of claim 1, wherein said alarm means comprises a horn, lights and taillights of said car, said horn being pulsated and lights flashed when said theft warning signal is received by said alarm means.

10. The theft warning system of claim 1, wherein said control means comprises a programmed microprocessor.

11. A theft warning system for use in a vehicle having a plurality of doors with door lock devices, comprising:
   an ignition switch having an open and a closed position and generating a signal indicating whether it is open or closed;
   a plurality of door switches, one for each of said doors, each said switch generating a signal indicating when its respective door is open;
   at least one detector for generating a signal when at least one of said door lock devices is unlocked;
   a plurality of key unlock detectors, one for each of said door lock devices, each said door unlock detector generating a signal when its respective door lock device is unlocked by use of a door key;

a programmed microprocessor receiving the signals generated by said door switches, said detectors, said door unlock detectors and said ignition switch, for setting a theft detecting condition when a last of said doors is closed by an operator outside of said vehicle while all of said door lock devices are maintained in a locked condition, and for generating a theft warning signal when a door is subsequently opened or unlocked without use of a door key; and means for sounding a horn of said vehicle and flashing headlights and taillights of said vehicle responsive to said theft warning signal.

* * * * *